United States Patent Office 3,356,630
Patented Dec. 5, 1967

3,356,630
STABILIZER FOR VINYL CHLORIDE POLYMERS
Joseph A. Vona, Westfield, and Edward J. Hensch, Fords, N.J., assignors to Celanese Corporation, a corporation of Delaware
No Drawing. Filed July 2, 1965, Ser. No. 469,340
3 Claims. (Cl. 260—30.4)

ABSTRACT OF THE DISCLOSURE

A polymerized vinyl chloride composition containing monoglycidyl ether of trimethylolpropane oxetane.

The present invention relates to a new compound and to the use of said compound as a stabilizer for vinyl chloride polymers.

The new compound of the present invention is the monoglycidyl ether of trimethylolpropane oxetane. This compound has the following structural formula:

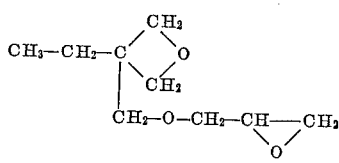

Trimethylolpropane oxetane, which alternatively may be referred to as 3-ethyl, 3-hydroxymethyl oxetane, has the following structural formula:

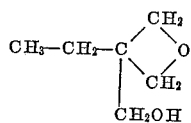

It may be reacted with sodium methylate ($CH_3ONa$) to yield 3-ethyl, 3-sodium methylate oxetane which has the following structural formula:

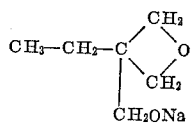

Finally, epichlorohydrin may be added to the reaction mixture and in an ensuing reaction the monoglycidyl ether or trimethylolpropane oxetane is formed with sodium chloride split out as a by-product.

It is known to use compounds containing epoxy functionality as stabilizers for vinyl chloride polymers. For example, epoxidized soybean oil is used for this purpose. However many compounds containing epoxy functionality are not useful for this purpose and it is always desirable to find the compounds containing epoxy functionality, which compounds will function as stabilizers for vinyl chloride polymers.

The vinyl chloride polymers which are stabilized according to the present invention may be poly(vinyl chloride)s or polymers containing vinyl chloride —$CH_2$—$CHCl$— units and the balance units resulting from the copolymerization with the vinyl chloride of at least one other ethylenically unsaturated compound. Ethylenically unsaturated compounds are well known and include for example vinyl acetate, acrylonitrile, vinylidene chloride, styrene, vinyl toluene, methyl styrene, halo styrenes, acrylic, methacrylic and crotonic acids, saturated alcohol esters of acrylic, methacrylic and crotonic acids, dialkyl styrenes, cyano styrenes, vinyl naphthalene, methacrylonitrile, ethyl methallyl ether, vinyl butyl ether, vinyl stearate, butyric esters of propionic, butyric and other acids, and the like. It is preferred that the vinyl chloride polymer contain at least about 70% by weight of —$CH_2$—$CHCl$— units.

For effective stabilization without excessive use of monoglycidyl ether of trimethylolpropane oxetane it is preferred that the weight ratio of the monoglycidyl ether of trimethylolpropane oxetane to the vinyl chloride polymer in the stabilized composition be about 2:100 to 20:100.

It is found that the monoglycidyl ether of trimethylolpropane oxetane in vinyl chloride polymer compositions functions as a plasticizer as well as a stabilizer. This is the same advantage as found where epoxidized soybean oil, for example, is used.

As is conventional for vinyl chloride polymer compositions, the stabilized vinyl chloride polymer composition of the present invention may be made into various shaped articles such as housewares, films, filaments and the like by such conventional techniques such as molding, extruding, casting and the like. Furthermore, the stabilized vinyl chloride polymer composition of the present invention may contain such conventional components as pigments, fillers, plasticizers, lubricants, mold release agents and the like.

The invention will now be further illustrated by reference to the following examples in which all proportions are given by weight unless otherwise indicated:

EXAMPLE

Part A.—Preparation of $CH_3ONa$

To a 1 liter, 1 neck flask equipped with a condenser is charged 230 grams of methanol and then through the condenser 23 grams of metallic sodium is slowly added. The sodium reacts with the methanol to form $CH_3ONa$.

Part B.—Preparation of the glycidyl ether of trimethylolpropane oxetane

To a 1 liter, 4 neck flask equipped with a stirrer, thermometer, condenser, addition funnel and heating mantle is charged through the addition funnel 116 grams of 3-ethyl, 3-hydroxymethyl oxetane and the $CH_3ONa$ prepared in part A. Heat is applied and methanol is distilled off until the contents of the flask reaches a temperature of 85° C. Then a vacuum is applied to the flask while continuing distillation to reduce the pressure to 40 mm. of mercury absolute. The final methanol is distilled azeotropically using a Vigreux column and 150 grams of dry toluene as the azeotropic solvent until the temperature of the flask contents reaches 115° C. and the temperature of the Vigreux column reaches 106° C. The reaction mixture is then cooled to 80° C. and using the addition funnel 110.4 grams of epichlorohydrin is slowly added. The reaction is somewhat exothermic and requires 45 minutes for addition of the epichlorohydrin while the temperature of the flask contents is maintained at 80° C. The reaction mixture is refluxed for 15 minutes. The reaction mixture is then washed with 200 cc. of water. The reaction mixture separates into an oil layer containing the monoglycidyl ether of trimethylolpropane oxetane and an aqueous layer containing sodium chloride. The oil is neutralized with 100 cc. of a 4% aqueous solution of sodium bicarbonate and then dried at a reduced pressure of 1 mm. of mercury absolute and 150° C. The oil, which is cloudy, is then filtered and the filtered oil is 138 grams of the monoglycidyl ether of trimethylolpropane oxetane.

Blended together are 100 parts of poly(vinyl-chloride) (Geon 101 EP), 45 parts of dioctyl phthalate as a plasticizer, 5 parts of the monoglycidyl ether of trimethylolpropane oxetane, 1.5 parts of Mark M (a stabilizer for vinyl chloride polymers, which is a blend of barium and cadmium soaps, probably the laurates, dissolved in a phosphite, probably triphenyl phosphite) and 0.5 part of stearic acid as a lubricant; this is known as Formulation A. Also prepared is a composition otherwise identical with Formulation A but containing 5 parts of Paraplex G-62 (an epoxidized soybean oil which is a conventional stabilizer for vinyl polymers) instead of 5 parts of the monoglycidyl ether of trimethylolpropane oxetane; this is designated Formulation B. Finally, as a control, a third formulation identical with the former two but containing no stabilizer is prepared; this is designated Formulation C. To test for heat stability the formulations are held at 160° C. Formulation A turns black after 13 hours at 160° C.; Formulation B turns tan after 13 hours at 160° C.; Formulation C turns black after 6 hours at 160° C. Thus, it is seen that the monoglycidyl ether of trimethylolpropane oxetane is a new stabilizer for vinyl chloride polymers which is almost as effective as the old stabilizer, epoxidized soybean oil.

The invention is not limited to the specific embodiments described herein, but it is intended that departures therefrom within the spirit of the invention be within the scope of the claims.

The embodiments of the invention in which an exclusive property or privilege is claimed are defined as follows:

1. A polymerized vinyl chloride composition comprising at least 70 percent vinyl chloride polymerized therein plasticized with monoglycidyl ether of trimethylolpropane oxetane.

2. The composition of claim 1 wherein the weight ratio of said monoglycidyl ether of trimethylolpropane oxetane to said vinyl chloride polymer ranges from about 2:100 to 20:100.

3. The composition of claim 2 wherein the polymerized vinyl chloride composition is a copolymer of ethylenically unsaturated compounds capable of polymerizing with vinyl chloride and vinyl chloride.

References Cited

UNITED STATES PATENTS

| | | | |
|---|---|---|---|
| 2,453,634 | 11/1948 | Marple | 260—348 |
| 2,745,846 | 5/1956 | Danzit | 260—348 |
| 2,745,847 | 5/1956 | Phillips | 260—348 |
| 2,956,975 | 10/1960 | Greenspan | 260—45.8 |
| 3,138,569 | 6/1964 | Lafont | 260—45.8 |

JULIUS FROME, *Primary Examiner.*